United States Patent [19]

Enomoto et al.

[11] Patent Number: 5,684,643
[45] Date of Patent: Nov. 4, 1997

[54] FAST WIDE-ANGLE LENS SYSTEM

[75] Inventors: Takashi Enomoto; Takayuki Ito, both of Tokyo, Japan

[73] Assignee: Asahi Kogaku Kogyo Kabushiki Kaisha, Tokyo, Japan

[21] Appl. No.: 698,920

[22] Filed: Aug. 16, 1996

[30] Foreign Application Priority Data

Aug. 25, 1995 [JP] Japan .................. 7-217732

[51] Int. Cl.⁶ .................. G02B 13/04; G02B 9/64
[52] U.S. Cl. .................. 359/751; 359/750; 359/755
[58] Field of Search .................. 359/749, 750, 359/751, 752, 753, 755

[56] References Cited

U.S. PATENT DOCUMENTS

| | | | |
|---|---|---|---|
| 3,999,840 | 12/1976 | Momiyama | 359/750 |
| 5,477,389 | 12/1995 | Ito et al. | 359/752 |
| 5,513,045 | 4/1996 | Ito et al. | 350/750 |
| 5,557,472 | 9/1996 | Ito et al. | 359/751 |

FOREIGN PATENT DOCUMENTS

| | | |
|---|---|---|
| 7-63986 | 3/1995 | Japan . |
| 7-63989 | 3/1995 | Japan . |

Primary Examiner—Scott J. Sugarman
Attorney, Agent, or Firm—Greenblum & Bernstein P.L.C.

[57] ABSTRACT

A wide-angle fast lens system includes a front lens group having a negative power, a diaphragm and a rear lens group having a positive power. The front lens group consists of a first sub-lens group and a second sub-lens group having a negative power. The lens system satisfies the following relationships:

$-0.6 < f/f_F < -0.2$, $6.0 < \Sigma d_{F+S}/f < 12.0$, $f/|f_{1a}| < 0.07$, and $0.4 < h_{aF}/h_{aL} < 0.65$, wherein "f" represents the focal length of the whole lens system, "$f_F$" represents the focal length of the front lens group, "$\Sigma d_{F+S}$" represents the sum of the thickness of the front lens group and the distance between the front and rear lens groups, "$f_{1a}$" represents the focal length of the first sub-lens group, "$h_{aF}$" represents the height of the paraxial rays incident on the first surface of the first sub-lens group, and "$h_{aL}$" represents the height of the paraxial rays incident on the last surface of the first sub-lens group.

5 Claims, 2 Drawing Sheets

1: 0.75

—— SA
- - SC

-0.1    0.1
SPHERICAL
ABERRATION

SINE CONDITION

1: 0.75

—— d line
······ g line
- - C line

-0.1    0.1
SPHERICAL
ABERRATION

CHROMATIC
ABERRATION

W= 37.3°

—— S
- - M

-0.1    0.1
ASTIGMATISM

W= 37.3°

-5    5  %
DISTORTION

1: 0.75

-0.1 0.1
SPHERICAL
ABERRATION

SINE CONDITION

—— SA
-- SC

1: 0.75

-0.1 0.1
SPHERICAL
ABERRATION

CHROMATIC
ABERRATION

—— d line
······· g line
— — C line

W= 38.3°

-0.1 0.1
ASTIGMATISM

—— S
-- M

W= 38.3°

-5 5 %
DISTORTION

FAST WIDE-ANGLE LENS SYSTEM

BACKGROUND OF THE INVENTION

1. Field of the Invention

The present invention relates to a wide-angle fast lens system (i.e., a wide angle lens having a large aperture) which can be applied to a small TV camera, such as a closed circuit television (CCTV) camera.

2. Description of the Related Art

In recent small TV cameras, such as CCTV cameras, in response to the demands of miniaturization and an increase in the resolution of image pickup devices, the image size has been changed from ½" (inches) to ⅓" (inches). To this end, there is a need for the provision of a fast wide-angle photographing lens, i.e., a wide-angle lens having a small F-number and a large aperture. The F-number of conventional photographing lenses of cameras is approximately F1.0 to F1.2.

SUMMARY OF THE INVENTION

It is an object of the present invention to provide a high performance wide-angle lens having a large aperture approximately equal to F0.75, which can be applied to a small TV camera in which the picture size of the image pickup device is approximately ⅓".

To achieve the object mentioned above, according to the present invention, there is provided a wide-angle fast lens system including a front lens group having a negative power, a diaphragm, and a rear lens group having a positive power, arranged in this order from an object side. The front lens group consists of a first sub-lens group and a second sub-lens group having a negative power. The lens system satisfies the following relationships (1) through (4):

(1) $-0.6 < f/f_F < -0.2$;

(2) $6.0 < \Sigma d_{F+S}/f < 12.0$;

(3) $f/|f_{1a}| < 0.07$;

(4) $0.4 < h_{aF}/h_{aL} < 0.65$, wherein $f$ represents the focal length of the whole lens system, $f_F$ represents the focal length of the front lens group, $\Sigma d_{F+S}$ represents the sum of the thickness of the front lens group and the distance between the front and rear lens groups, $f_{1a}$ represents the focal length of the first sub-lens group of the first lens group, $h_{aF}$ represents the height of paraxial rays incident on a first surface (i.e., the surface closest the object side) of the first sub-lens group of the first lens group, and $h_{aL}$ represents the height of paraxial rays incident on a last surface (i.e., the surface closest the image side) of the first sub-lens group of the first lens group.

Preferably, the wide-angle fast lens system satisfies the following relationship (5):

(5) $0.3 < d_{ab}/f < 2.0$, wherein $d_{ab}$ represents the distance between the first sub-lens group and the second sub-lens group of the first lens group.

The rear lens group can consist of a positive lens element having a convex surface on the image side, a cemented lens having a negative lens element and a positive lens element cemented at a cementing concave surface facing the image side, and a positive lens element having a convex surface on the object side. At least one of the surfaces of the lens elements of the rear lens group is provided with a divergent aspherical surface. Preferably, the rear lens group satisfies the following relationships (6) and (7):

(6) $-1.2 < \Delta I_{ASP} < -0.5$; and (7) $3.0 < \Sigma d_R/f < 6.0$, wherein $\Delta I_{ASP}$ represents the aberration factor of the aspherical term of the third-order spherical aberration factors of the aspherical surface (assuming that the focal length is 1.0), and $\Sigma d_R$ represents the thickness of the rear lens group.

The present disclosure relates to subject matter contained in Japanese Patent Application No. 7-217732 (filed on Aug. 25, 1995) which is expressly incorporated herein by reference in its entirety.

BRIEF DESCRIPTION OF THE DRAWINGS

The present invention will be described below in detail with reference to the accompanying drawings, in which similar elements are indicated by similar reference numerals, and wherein.

DESCRIPTION OF THE PREFERRED EMBODIMENTS

Figure 1:
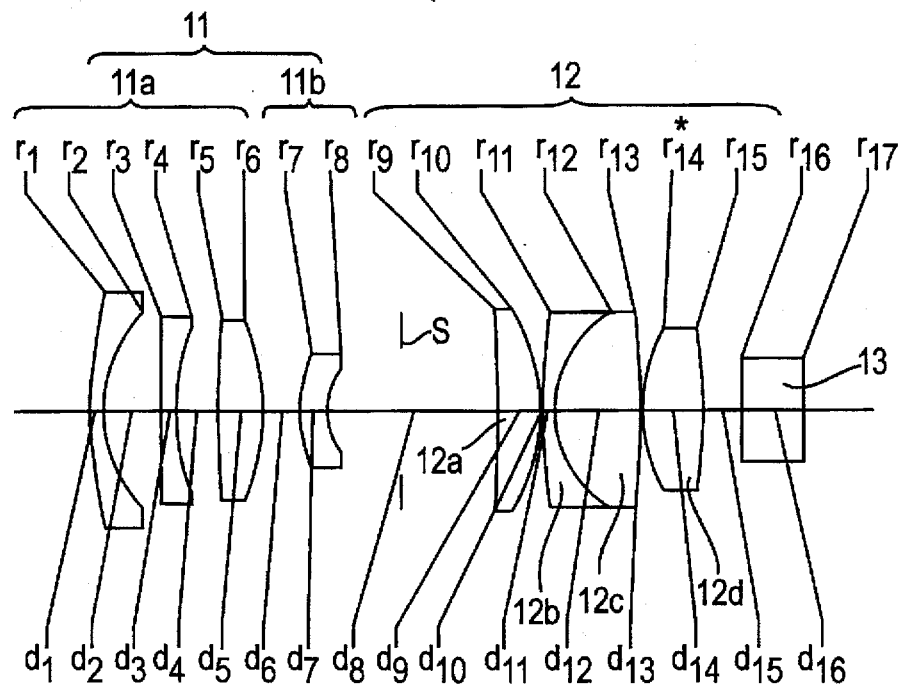
FIG. 1 is a schematic view of a lens arrangement of a wide-angle lens system having a large aperture, according to a first embodiment of the present invention.
Figure 2A:
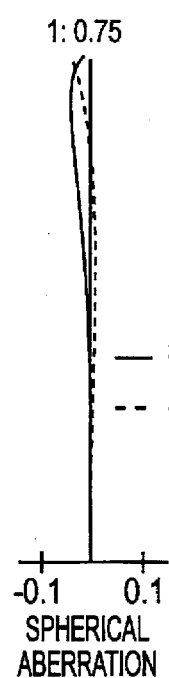
FIGS. 2A, 2B, 2C and 2D show aberration diagrams of the wide-angle lens system shown in FIG. 1.
Figure 2B:
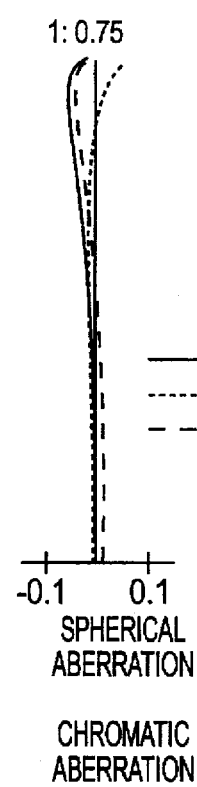
Figure 2C:
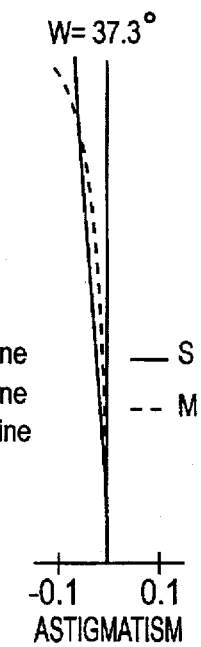
Figure 2D:
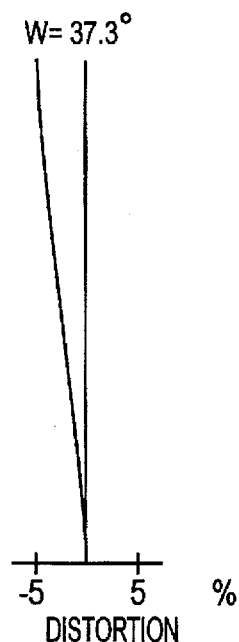
Figures 3, 4A, 4B, 4C, 4D:
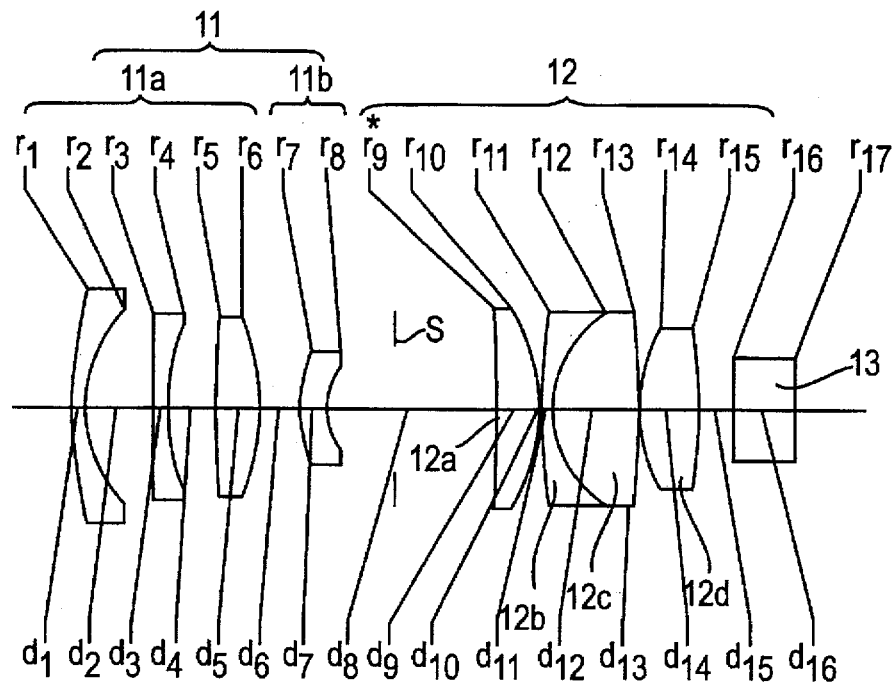
FIG. 3 is a schematic view of a lens arrangement of a wide-angle lens system having a large aperture, according to a second embodiment of the present invention.
FIGS. 4A, 4B, 4C and 4D show aberration diagrams of the wide-angle lens system shown in FIG. 3.

A wide-angle lens system having a large aperture according to the present invention consists of a negative lens group (front lens group 11), a diaphragms and a positive lens group (rear lens group 12), arranged in this order from an object side of the lens, i.e., the left hand side of FIGS. 1 and 3. In a wide-angle lens system consisting of a negative lens group and a positive lens group, if the focal length is shortened in accordance with the change of the picture size of an image pickup device of a small TV camera from ½" to ⅓", it is necessary to increase the negative power of the front lens group (negative lens group) in order to have the same back focal distance ($f_B$) as that for the picture size of ½". Moreover, it is necessary to consider the power distribution of the front lens group in connection with the power of the whole optical system.

Relationship (1) ($-0.6 < f/f_F < -0.2$) specifies the negative power of the front lens group 11. If the value of the ratio defined in relationship (1) is above the upper limit, the back focal distance is too small for mounting to a small TV camera. If the value of the ratio defined in relationship (1) is below the lower limit, aberrations produced in the front lens group 11 are too large to correct.

Relationship (2) ($6.0 < \Sigma d_{F+S}/f < 12.0$) specifies the requirements of the sum of the thickness of the front lens group 11 and the distance between the front lens group 11 and the rear lens group 12, that is the distance between the surface of the front lens group 11 nearest the object side and the surface of the rear lens group 12 nearest the object side. If the value of the ratio specified in relationship (2) exceeds the upper limit, the whole length of the lens system is increased and the diameter of the front lens group 11 is increased. If the value of the ratio specified in relationship (2) is smaller than the lower limit, i.e., if the back focal distance is increased, the negative power of the front lens group 11 is too large to correct the aberrations.

The front lens group 11 consists of a first sub-lens group 11a having a small power and a second sub-lens group 11b having a negative power, in this order from an object side of the lens. It is preferable that the power of the first sub-lens group 11a is set small as specified in relationship (3) ($|f/f_{1a}|<0.07$) and the change in the height of the paraxial rays ($h_{aL}/h_{aF}$) is set large as specified in relationship (4) ($0.4<h_{aF}/h_{aL}<0.65$). Namely, it is preferable that the angular magnification $h_{aF}/h_{aL}$ be reduced. If the value specified in relationship (3) exceeds the upper limit, the aberrations caused in the first sub-lens group 11a become too large to correct. The relationships (3) and (4) also specify the requirement to split the front lens group 11 into the first sub-lens group 11a and the second sub-lens group 11b. If the front lens group 11 is split into the first sub-lens group 11a and the second sub-lens group 11b so as to satisfy relationships (3) and (4), not only can the back focal distance be increased but also the aberrations can be effectively corrected. The first sub-lens group 11a can be made of, for example, two negative lens elements and one positive lens element in this order from the object side.

Relationship (4) specifies the height of the paraxial ray incident on the first surface of the first sub-lens group 11a of the first group 11 (i.e., the surface of the first sub-lens group 11a nearest the object side) and the height of the paraxial ray incident on the last surface of the first sub-lens group 11a of the first lens group 11 (i.e., the surface of the first sub-lens group 11a nearest the image side). In the first sub-lens group 11a having a small power as specified in relationship (3), the value of relationship (4) substantially corresponds to the angular magnification. If the value is smaller than the lower limit specified in relationship (4), the change in the height of the paraxial rays incident on the first sub-lens group 11a is too large (i.e., the angular magnification is too small) to correct the aberrations. If the value exceeds the upper limit specified in relationship (4), the change in the height of the paraxial rays is too small to meet the requirement for the back focal distance.

Relationship (5) ($0.3<d_{ab}/f<2.0$) specifies the distance between the first sub-lens group 11a and the second sub-lens group 11b of the first lens group 11. If the distance between the first sub-lens group 11a and the second sub-lens group 11b is above the upper limit specified in relationship (5), the diameter of the front lens group 11 is increased. If the value of the ratio defined in relationship (5) is below the lower limit, it is difficult to correct the distortion.

Relationship (6) ($-1.2<\Delta I_{ASP}<-0.5$) relates to the divergent aspherical surface provided to at least one of the surfaces of the lens elements in the rear lens group 12. The aspherical surface is formed by applying an aspherical surface on a paraxial spherical surface (spherical substrate or spherical base surface). The expression "divergent aspherical surface" refers to an aspherical surface which provides a divergence to the surface refracting power of the spherical base surface. If the value specified in relationship (6) is above the upper limit, the effect of the aspherical surface is attenuated and the spherical aberration and the comatic aberration (i.e., coma) cannot be effectively corrected. Conversely, if the value defined in relationship (6) is smaller than the lower limit, an over correction of the aberrations mentioned above occurs.

Relationship (7) ($3.0<\Sigma d_R/f<6.0$) specifies the thickness of the rear lens group 12 to increase the aperture. If the value defined in relationship (7) is above the upper limit, the whole lens length and the diameter of the rear lens group 12 are increased. Conversely, if the value specified in relationship (7) is below the lower limit, the thickness of the peripheral portion of the lens is too small to obtain a wide-angle lens having a large aperture approximately identical to F0.75.

The variation of the third-order aspherical aberration coefficient due to the aspherical surface is discussed below.

An aspherical shape (surface) is defined by the following relationship, namely:

$$x=cy^2/[1+\{1-(1+K)c^2y^2\}^{1/2}]+A4y^4+A6y^6+A8y^8+A10y^{10}+ \quad (i)$$

wherein x represents aspherical shape, c represents curvature, y represents height from optical axis, K represents a conic constant, A4 represents a fourth-order aspherical factor, A6 represents a sixth-order aspherical factor, A8 represents an eighth-order aspherical factor, and A10 represents a tenth-order aspherical factor.

In relationship (i), to obtain an aberration coefficient, the following replacements are made, since Bi=Ai when K=0:

$$B4=A4+Kc^3/8;$$

$$B6=A6+(K^2+2K)c^5/16;$$

$$B8=A8+5(K^3+3K^2+3K)c^7/128; \text{ and}$$

$$B10=A10+7(K^4+4K^3+6K^2+4K)c^9/256.$$

Thus, relationship (ii) can be obtained from relationship (i):

$$x=cy^2/[1+\{1-c^2y^2\}^{1/2}]+B4y^4+B6y^6+B8y^8+B10y^{10}+ \quad (ii)$$

Further, relationship (iii) can be obtained, in terms of the focal length f=1.0, when X=x/f, Y=y/f, C=f·c, $\alpha 4=f^3 B4$, $\alpha 6=f^5 B6$, $\alpha 8=f^7 B8$, and $\alpha 10=f^9 B10$.

Relationship (iii):

$$X=CY^2/[1+\{1-C^2Y^2\}^{1/2}]+\alpha 4Y^4+\alpha 6Y^6+\alpha 8Y^8+\alpha 10Y^{10}+ \quad (iii)$$

The second and subsequent terms of relationship (iii) (i.e., $\alpha 4Y^4$ onwards) represent amounts of asphericity. The constant $\alpha 4$ has the following relationship with the third-order aspherical surface coefficient $\Phi$:

$$\Phi=8(N'-N)\alpha 4$$

wherein N represents the refractive index of the side closer to the object than the aspherical surface, and N' represents the refractive index of the side closer to the image side than the aspherical surface.

Influence on a fourth aspherical factor to each aberration coefficient is given as follows:

$\Delta I=h^4\Phi$;

$\Delta II=h^3 H\Phi$;

$\Delta III=h^2 H^2\Phi$; and $\Delta IV=h^2 H^2\Phi$; and

ΔV=hH³Φ, wherein I represents a third-order aspherical aberration factor,

II represents a third-order comatic aberration factor,

III represents a third-order astigmatism factor,

IV represents a third-order curvature factor of the sagittal image surface,

V represents a third-order distortion factor, h represents a height of the portion of the lens at which the paraxial on-axis ray passes through the lens, and H represents a height of the portion of the lens at which the paraxial off-axis ray passes through the center of the pupil.

Several examples (embodiments) of the present invention are discussed below.

FIGS. 1 and 3 show lens arrangements of the first and second embodiments, respectively. In the first and second embodiments, the lens system consists of the front lens group 11, the diaphragm S, and the rear lens group 12, in this order from the object side. The front lens group 11 consists of the two sub-lens groups, i.e., first sub-lens group 11a and second sub-lens group 11b. The first sub-lens group 11a consists of three lens elements (surface Nos. 1 to 6). The second sub-lens group 11b is a single lens element (surface Nos. 7 and 8).

The rear lens group 12 consists of a positive convexo-concave lens element 12a having a convex surface on the image side and a concave surface on the object side, a negative concavo-convex lens element 12b having a concave surface located on the image side and a convex surface located on the object side, a positive convexo-convex (double convex) lens element 12c and a positive convexo-convex (double convex) lens element 12d. The negative lens element 12b and the positive lens element 12c are cemented together. The curvature of the surface of the positive lens element 12a on the image side (surface No. 10) is greater than the curvature of the surface thereof on the object side (surface No. 9). The curvature of the cementing surface between the cemented negative lens element 12b and positive lens element 12c (surface No. 12) is greater than the curvature of the remaining surfaces (surface Nos. 11 and 13). The curvature of the surface of the positive convexo-convex lens element 12d on the object side (surface No. 14) is greater than the curvature of the surface thereof on the image side (surface No. 15).

The surface Nos. 16 and 17 define a glass cover 13 of the CCD (not shown). Note that in practice, the glass cover 13 is integrally provided with a filter, but is referred to herein as a single glass cover.

The first and second embodiments will described with reference to the following tables and the accompanying diagrams, in which "$F_{NO}$" represents the F-number, "f" represents the focal length, "ω" represents the half angle of view, "$f_B$" represents the back focal distance (distance between the surface of the last lens on the image side and the image pickup surface of the CCD including the glass cover 13; the image pickup surface is identical to the second (image-side) surface of the glass cover in the illustrated embodiments), "ri" represents the radius of curvature of each lens surface, "di" represents the lens thickness or distance between adjacent lenses, "N" represents the refractive index of the d-line, and "ν" represents the Abbe number of the d-line. In the aberration drawings (FIGS. 2A through 2D and 4A through 4D) "SA" represents the spherical aberration, "SC" represents the sine condition, "d-line", "g-line" and "C-line" represent the chromatic aberrations represented by spherical aberrations at the respective wavelengths, "S" represents the sagittal rays, and "M" represents the meridional rays, respectively. "W" represents the half angle of view.

The shape of the aspherical surface can be generally expressed as follows:

$$x = cy^2/\{1+[1-(1+K)c^2y^2]^{1/2}\} + A4y^4 + A6y^6 + A8y^8 + A10y^{10} + \ldots$$

wherein, y represents a height above the axis, x represents a distance from a tangent plane of an aspherical vertex, c represents a curvature of the aspherical vertex (1/r), K represents a conic constant, A4 represents a fourth-order aspherical factor, A6 represents a sixth-order aspherical factor, A8 represents an eighth-order aspherical factor, and A10 represents a tenth-order aspherical factor.

First Embodiment

A lens arrangement of a wide-angle lens system having a large aperture according to the first embodiment is shown in FIG. 1. Numerical data regarding the first embodiment is shown in Table 1 below. Aberrations in the lens system of the first embodiment are shown in FIGS. 2A, 2B, 2C and 2D.

TABLE 1

$F_{NO} = 1:0.75$
$f = 4.12$
$\omega = 37.3$
$f_B = d_{15} + d_{16} = 9.40$

| surface No. | r | d | N | ν |
|---|---|---|---|---|
| 1 | 37.102 | 1.30 | 1.74320 | 49.3 |
| 2 | 12.987 | 5.50 | — | — |
| 3 | −142.500 | 1.20 | 1.69680 | 55.5 |
| 4 | 21.312 | 3.89 | — | — |
| 5 | 76.198 | 4.18 | 1.84666 | 23.8 |
| 6 | −21.584 | 3.45 | — | — |
| 7 | 12.734 | 2.50 | 1.84666 | 23.8 |
| 8 | 6.818 | 6.66 | — | — |
| diaphragm | ∞ | 9.11 | — | — |
| 9 | −106.721 | 4.03 | 1.78800 | 47.4 |
| 10 | −17.223 | 0.10 | — | — |
| 11 | 49.138 | 1.20 | 1.84666 | 23.8 |
| 12 | 10.144 | 8.12 | 1.77250 | 49.6 |
| 13 | −74.200 | 0.11 | — | — |
| 14 | 13.765 | 5.70 | 1.66625 | 55.2 |
| 15 | −51.786 | 3.70 | — | — |
| 16 | ∞ | 5.70 | 1.49782 | 66.8 |
| 17 | ∞ | — | — | — |

*designates aspherical surface

Aspherical Data for Surface No. 14:
K=0.0, A4=−0.39130×10⁻⁴, A6=−0.41090×10⁻⁶, A8=0.41830×10⁻⁸, A10=−0.35520×10⁻¹⁰, A12=0.0

Second Embodiment

A lens arrangement of a wide-angle lens system of a large aperture according to the second embodiment is shown in FIG. 3. Numerical data regarding the second embodiment is shown in Table 2 below. Aberrations in the lens system of the second embodiment are shown in FIGS. 4A, 4B, 4C and 4D.

TABLE 2

$F_{NO} = 1:0.75$
$f = 4.05$
$\omega = 38.3$
$f_R = d_{15} + d_{16} = 9.38$

| surface No. | r | d | N | v |
|---|---|---|---|---|
| 1 | 30.654 | 1.30 | 1.74320 | 49.3 |
| 2 | 12.212 | 6.30 | — | — |
| 3 | −138.233 | 1.20 | 1.69680 | 55.5 |
| 4 | 21.395 | 4.36 | — | — |
| 5 | 71.089 | 4.18 | 1.84666 | 23.8 |
| 6 | −22.431 | 3.87 | — | — |
| 7 | 13.561 | 2.50 | 1.84666 | 23.8 |
| 8 | 7.058 | 6.66 | — | — |
| diaphragm | ∞ | 9.11 | — | — |
| 9* | −91.388 | 4.25 | 1.78800 | 47.4 |
| 10 | −16.007 | 0.10 | — | — |
| 11 | 44.135 | 1.20 | 1.84666 | 23.8 |
| 12 | 10.068 | 8.12 | 1.77250 | 49.6 |
| 13 | −54.315 | 0.10 | — | — |
| 14 | 14.481 | 5.12 | 1.66625 | 55.2 |
| 15 | −186.107 | 3.68 | — | — |
| 16 | ∞ | 5.70 | 1.49782 | 66.8 |
| 17 | ∞ | — | — | — |

*designates aspherical surface

Aspherical Data for Surface No. 9:
K=0.0, A4=−0.36676×10⁻⁴, A6=0.21269×10⁻⁶, A8=−0.82940×10⁻¹⁰, A10=−0.43867×10⁻¹¹, A12=0.0

Numerical values of the relationships (1) through (7) corresponding to the first and second embodiments are shown in Table 3 below.

TABLE 3

| | Embodiment 1 | Embodiment 2 |
|---|---|---|
| Relationship(1) | −0.32 | −0.32 |
| Relationship(2) | 9.16 | 9.76 |
| Relationship(3) | 0.005 | 0.011 |
| Relationship(4) | 0.60 | 0.58 |
| Relationship(5) | 0.84 | 0.96 |
| Relationship(6) | −0.64 | −0.96 |
| Relationship(7) | 4.67 | 4.67 |

As can be seen from Table 3 above, the first and second embodiments satisfy the requirements specified in relationships (1) through (7). It can be also seen from FIGS. 2A–2D, and 4A–4D, that the aberrations are appropriately corrected.

As can be understood from the above discussion, according to the present invention, a highly effective fast wide-angle lens system having a large aperture approximately equal to F0.75, for a small TV camera, can be provided.

What is claimed is:

1. A fast wide-angle lens system, comprising:
   a front lens group having a negative power;
   a diaphragm; and
   a rear lens group having a positive power,
   wherein said front lens group, said diaphragm and said rear lens group are arranged in this order from an object side,
   said front lens group comprising a first sub-lens group, and a second sub-lens group having a negative power,
   wherein said lens system satisfies the following relationships:

$-0.6 < f/f_F < -0.2$,
   $6.0 < \Sigma d_{F+S}/f < 12.0$,
   $f/|f_{1a}| < 0.07$, and
   $0.4 < h_{aF}/h_{aL} < 0.65$, wherein
   f represents a focal length of the whole lens system,
   $f_F$ represents a focal length of said front lens group,
   $\Sigma d_{F+S}$ represents a sum of a thickness of said front lens group and a distance between said front lens group and rear lens group,
   $f_{1a}$ represents a focal length of said first sub-lens group of said first lens group,
   $h_{aF}$ represents a height of paraxial rays incident on a first surface of said first sub-lens group of said first lens group, and
   $h_{aL}$ represents a height of paraxial rays incident on a last surface of said first sub-lens group of said first lens group.

2. The fast wide-angle lens system according to claim 1, wherein said lens system satisfies the following relationship:

$0.3 < d_{ab}/f < 2.0$, wherein $d_{ab}$ represents a distance between said first sub-lens group and said second sub-lens group of said first lens group.

3. The fast wide-angle lens system according to claim 1, wherein said rear lens group is comprised of a positive lens element having a convex surface on an image side, a cemented lens of a negative lens element and a positive lens element cemented at a cementing concave surface facing said image side, and a positive lens element having a convex surface on said object side, at least one of the surfaces of said lens elements of said rear lens group being provided with a divergent aspherical surface, wherein the following relationships are satisfied:

$-1.2 < \Delta I_{ASP} < -0.5$, and
   $3.0 < \Sigma d_R/f < 6.0$; and wherein $\Delta I_{ASP}$ represents an aberration factor of an aspherical term of a third-order spherical aberration factor of said aspherical surface, assuming that when the focal length is 1.0, and $\Sigma d_R$ represents a thickness of said rear lens group.

4. The fast wide-angle lens system according to claim 1, wherein said first sub-lens group comprises a negative first lens element, a negative second lens element and a positive third lens element, in this order from said object side.

5. The fast wide-angle lens system according to claim 1, wherein said second sub-lens group comprises a negative single lens element.

* * * * *